(12) United States Patent
Bui et al.

(10) Patent No.: US 6,580,581 B1
(45) Date of Patent: Jun. 17, 2003

(54) RECOVERY OF LATERAL POSITION OF A SERVO SYSTEM WITH RESPECT TO LONGITUDINAL SERVO BANDS OF A MAGNETIC TAPE

(75) Inventors: Nhan Xuan Bui, Tucson, AZ (US); John Alexander Koski, Tucson, AZ (US); Akimitsu Sasaki, Yokohama (JP); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 09/639,076

(22) Filed: Aug. 16, 2000

(51) Int. Cl.$^7$ .............................................. G11B 5/584
(52) U.S. Cl. ................ 360/78.02; 360/78.06; 360/78.07; 360/78.08; 360/78.09; 360/78.11; 360/77.12; 369/13.37
(58) Field of Search .................... 360/72.1, 74.5, 360/74.6, 77.01, 77.12, 78.02; 369/13.37

(56) References Cited

U.S. PATENT DOCUMENTS

| 5,262,908 A |   | 11/1993 | Iwamatsu et al. ........ 360/77.12 |
|---|---|---|---|
| 5,339,299 A | * | 8/1994 | Kagami et al. .......... 369/30.13 |
| 5,566,378 A | * | 10/1996 | Nagasawa et al. ........ 360/77.16 |
| 5,689,384 A | * | 11/1997 | Albrecht et al. ........ 360/77.12 |
| 5,828,514 A | * | 10/1998 | Chliwnyj et al. ........ 360/77.12 |
| 5,920,439 A |   | 7/1999 | Gillingham et al. .......... 360/48 |
| 5,946,159 A | * | 8/1999 | Chliwnyj et al. ........ 360/77.12 |
| 5,949,607 A |   | 9/1999 | Kalfs et al. .............. 360/78.02 |
| 5,949,619 A |   | 9/1999 | Eckberg et al. ............. 360/106 |
| 5,969,898 A | * | 10/1999 | Hansen et al. ........... 360/77.16 |
| 5,973,869 A | * | 10/1999 | Gillingham et al. .......... 360/49 |
| 6,031,673 A | * | 2/2000 | Fasen et al. .................. 360/53 |
| 6,134,070 A | * | 10/2000 | Tran et al. .................... 360/75 |
| 2002/0167751 A1 | * | 11/2002 | Lee et al. .................. 360/72.1 |

FOREIGN PATENT DOCUMENTS

EP         0940812 A      9/1999     ........... G11B/21/08

* cited by examiner

Primary Examiner—Richemond Dorvil
Assistant Examiner—Glenda P. Rodriguez
(74) Attorney, Agent, or Firm—John H. Holcombe

(57) ABSTRACT

A servo system and method position a head laterally with respect to magnetic tape longitudinal defined servo bands arranged in a longitudinally shifted pattern for identification, and separated by data tracks. A servo controller responds to a loss of lateral position, sensing an estimated longitudinal position of the magnetic tape. If the estimated longitudinal position is within a predetermined distance of an end of the tape, the servo controller operates a drive to continuously move the tape away from the sensed end. The servo controller senses a home lateral position sensor to determine whether a compound actuator is within a predetermined distance of the edge of the magnetic tape. If so, it operates the coarse actuator portion of the compound actuator to move laterally away from the edge of the magnetic tape; else, to move toward the edge. The servo controller senses a dual servo sensor to detect any two of the defined servo bands; and, upon sensing any two of the defined servo bands, detects the longitudinal shift to identify which ones of the two defined servo bands have been detected.

15 Claims, 7 Drawing Sheets

| SERVO BAND N | SERVO BAND N+1 | RELATIVE POSITION OF N+1 SERVO |
|---|---|---|
| 0 | 1 | LATE BY A μm |
| 1 | 2 | EARLY BY A μm |
| 2 | 3 | LATE BY B μm |
| 3 | 4 | EARLY BY B μm |

RECOVERY OF LATERAL POSITION OF A SERVO SYSTEM WITH RESPECT TO LONGITUDINAL SERVO BANDS OF A MAGNETIC TAPE

DOCUMENTS INCORPORATED BY REFERENCE

Commonly assigned U.S. Pat. No. 5,689,384 is incorporated for its showing of a timing based track following servo system for use with magnetic tape systems in which magnetic servo track patterns contain transitions recorded at more than one azimuthal orientation across the width of the servo track.

FIELD OF THE INVENTION

This invention relates to servo systems for positioning magnetic heads laterally with respect to longitudinal defined servo tracks or bands recorded on magnetic tape, and, more particularly, to recovery of lateral position once lateral position has been lost.

BACKGROUND OF THE INVENTION

The reading and/or writing of data in tracks on magnetic recording tape requires precise positioning of a magnetic head. The magnetic head must be moved to, and maintained centered over, specific longitudinal data tracks, as the magnetic tape is moved longitudinally past the magnetic head. The magnetic head is translated between tracks in a lateral direction with respect to the longitudinal data tracks.

A servo system is employed to move the magnetic head to and position the magnetic head in the center of the desired data track or tracks, and to track follow the center of the desired data track or tracks. The data tracks are becoming increasingly smaller and closer together in order to increase the data track density and thereby increase data capacity of a given tape. Hence, it has become desirable to place the longitudinal defined servo tracks or bands at various locations across the full width of the tape, separated by groups of data tracks. This allows the servo tracks or bands to be close to the data tracks and limit offsets due to tape stretch, etc. This also allows a greater number of tracks to be employed due to the greater precision of the relationship between the servo tracks or bands and the data tracks.

An advantageous type of servo track is that of the incorporated '384 patent, which is timing based. The magnetic servo track patterns contain transitions recorded at more than one azimuthal orientation across the width of the servo track, such that the timing of the servo position signal pulses derived from reading the servo pattern at any point on the pattern varies continuously as the head is moved laterally across the width of the servo track. The timing of pulses generated by the servo sensor is decoded to provide a speed invariant position signal used by the servo system to position the data heads over the desired data tracks.

Any one servo track may additionally have a plurality of indexed defined servo positions across the width of the servo track, called a servo band, thereby further increasing the number of data tracks that can be placed in the space between the servo bands. Herein, "servo band" comprises a single position servo track or a servo track having a plurality of indexed servo positions.

So as to maximize the number of data tracks, the width of the servo bands is as narrow as practical, and the separation between the servo bands is as far apart as practical. An approach for maximizing the precision of the servo bands with respect to the data tracks is discussed in the above specification, and comprises employing a dual servo sensor for sensing the lateral position with respect to two of the defined servo bands, which are on opposite sides of the data tracks. The servo signals detected from the two defined servo bands may be averaged or separately detected for redundancy to better position the magnetic head at the data tracks. In one example, five defined servo bands may be placed across the width of the magnetic tape, and each servo band may have six index positions across the width of the defined servo band. Still further, the magnetic head may have a plurality of read/write transducers which are situated between the servo sensor transducers, so that a large number of data tracks may be provided for each index position.

Such servo systems typically employ compound actuators to provide both a large working dynamic band and high bandwidth. A typical compound actuator comprises a coarse actuator portion, such as a stepper motor, and a fine actuator portion, such as a voice coil motor, mounted on the coarse actuator portion. Thus, a data head can be translated between index positions and between servo bands over a full width of the magnetic tape using the coarse actuator portion, and can track follow the lateral movement of the track, using the fine actuator portion of the compound actuator. The fine actuator portion of the compound actuator typically follows the track guiding disturbances to position the magnetic head at the center of the desired data tracks. However, it has a very limited range of travel. The coarse actuator portion carries the fine actuator portion from index position to index position and between servo bands.

As the result, as the compound actuator moves the magnetic head between groups of data tracks, the associated dual servo sensor moves across an extended transverse span of data tracks, and the servo system lacks any servo signals from the servo bands for feedback for precision control. The stepper motor of the coarse actuator portion is typically driven forward or backward by step drive pulses. Thus, the number of pulses are counted as the coarse actuator is moved in order to estimate when the coarse actuator has moved a certain distance such that one or more groups of the data tracks have been crossed and the desired set of two servo bands has been reached, with the desire to place the dual servo sensor within the target servo band. Then, the position error signal (PES) is employed to further move the coarse actuator to the desired index position within the servo band. The fine actuator may then lock to the desired index position of the band and follow the index position. If the coarse actuator can move to the new absolute lateral position within some tolerance enough to detect the PES, no problem occurs in the sequence to acquire the target index position.

However, the coarse actuator is driven by the stepper motor by means of a lead-screw, and typically has no absolute position sensor to provide coarse actuator position feedback. The stepper motor is driven essentially in an open loop manner, by supplying step signals, and actual motor response to the step signals is not monitored. The coarse actuator may stick at some position on the way to the new absolute reference position due to mechanical reasons, such as gear friction or particle effects, or the coarse actuator may jump over the new absolute reference position due to non-linearity factors on the coarse actuator, such as spring force effects, distortion of the gear, and gear and lead-screw backlash. When these errors are large enough to move the servo read element out of the servo bands, the lateral position is completely lost to the track following servo system and the acquire fails.

A sensing system may be provided to monitor the absolute position of the magnetic head relative to the magnetic tape in real time, such as an optical sensor and related electronics, but requires mounting space and is costly. It may be possible to move the tape and the coarse actuator to "home positions" and to then derive the home position locations, and then attempt to recover by moving the tape and the coarse actuator to the vicinity of the tape head when the lateral position was lost. However, this is time consuming and highly disruptive, and may be ineffective

SUMMARY OF THE INVENTION

An object of the present invention is to provide recovery of lateral position once lateral position has been lost, without the addition of an absolute position monitor.

Disclosed are a servo system and method for positioning a magnetic head laterally with respect to a plurality of parallel, longitudinal defined servo bands of a magnetic tape, the defined servo bands each separated by a plurality of data tracks parallel to the defined servo bands, the defined servo bands arranged in a longitudinally shifted pattern for identification, the magnetic tape drive having a drive system for moving the magnetic tape in the longitudinal direction at a nominal speed for reading and/or writing data on the magnetic tape.

The servo system for recovering lateral position comprises a dual channel servo sensor, such as a dual channel read head and detector, for sensing lateral position of the head with respect to two of the defined servo bands; a compound actuator having a fine actuator portion for translating the head laterally with respect to the defined servo bands, and a coarse actuator portion for translating the fine actuator portion laterally with respect to the defined servo bands; a home lateral position sensor for sensing whether the compound actuator is within a predetermined distance of an edge of the tape; a longitudinal position estimator for estimating the longitudinal position of the tape; and a servo controller.

The servo controller is coupled to the dual sensor, the compound actuator, the home lateral position sensor, the longitudinal position estimator, and the drive system, for operating the compound actuator to laterally position the dual servo sensor at two of the defined servo bands, and to track follow the same index position at each of the two defined servo bands, thereby positioning the head.

The servo controller responds to a loss of the lateral position, sensing the longitudinal position estimator estimated longitudinal position of the magnetic tape. If the sensed estimated longitudinal position of the magnetic tape is within a predetermined distance of an end of the tape, the servo controller operates the magnetic tape drive to continuously move the magnetic tape in a longitudinal direction away from the sensed end of the magnetic tape; else, determines the direction the drive was moving the magnetic tape and operates the drive to continuously move the tape in the opposite direction. The servo controller senses the home lateral position sensor to determine whether the compound actuator is laterally within a predetermined distance of the edge of the magnetic tape. If the compound actuator is within the predetermined distance of the edge of the magnetic tape, the servo controller operates the coarse actuator portion in a lateral direction to move away from the edge of the magnetic tape; else, operates the coarse actuator portion to move in a lateral direction toward the edge. The servo controller senses the dual servo sensor to detect any two of the defined servo bands; and, upon sensing any two of the defined servo bands, detects the longitudinal shift between two servo bands to identify which ones of the two defined servo bands have been detected.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
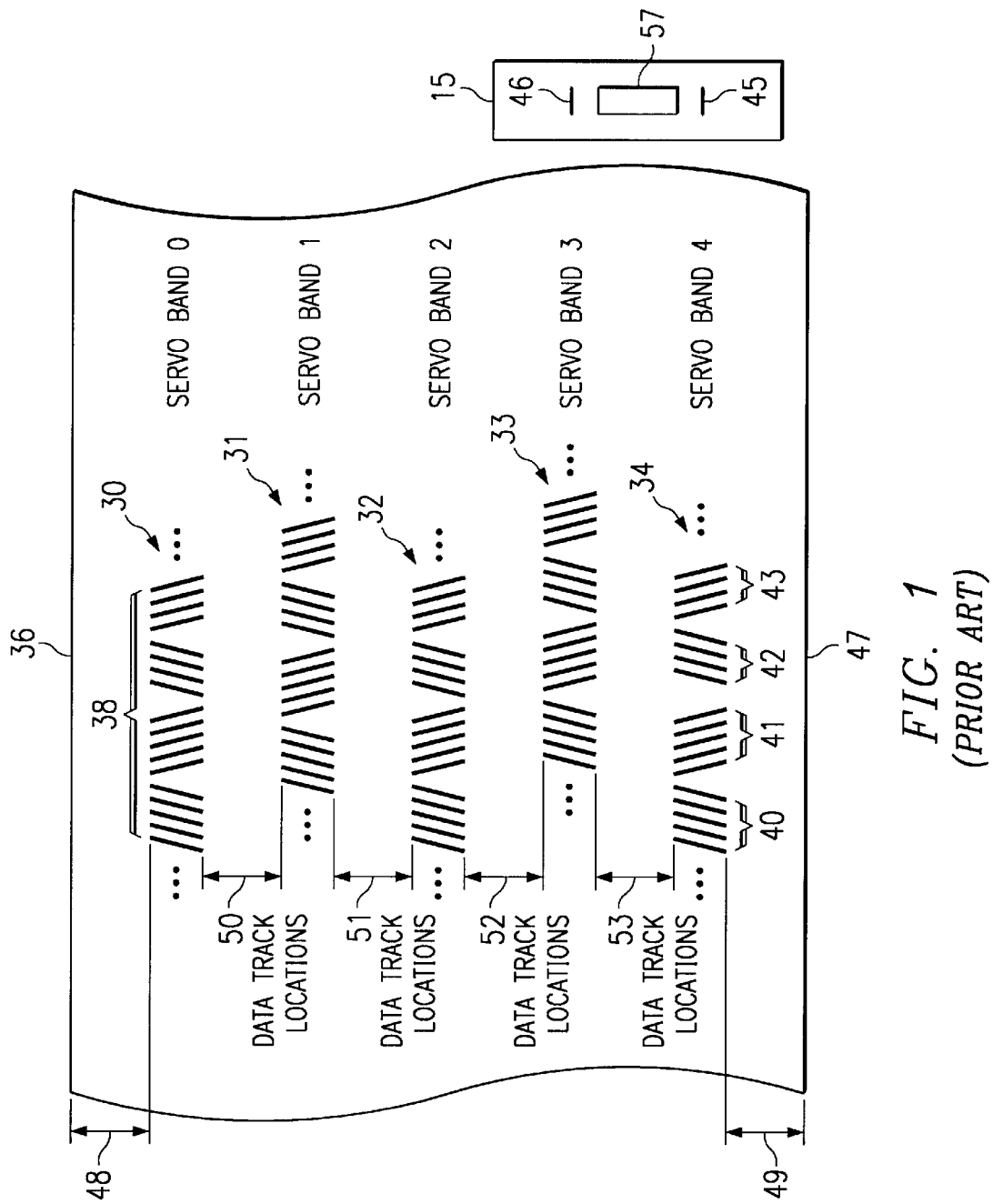
FIG. 1 is a diagrammatic representation of a prior art magnetic tape having multiple timing based servo bands which are employed to implement the present invention.
Figure 2:
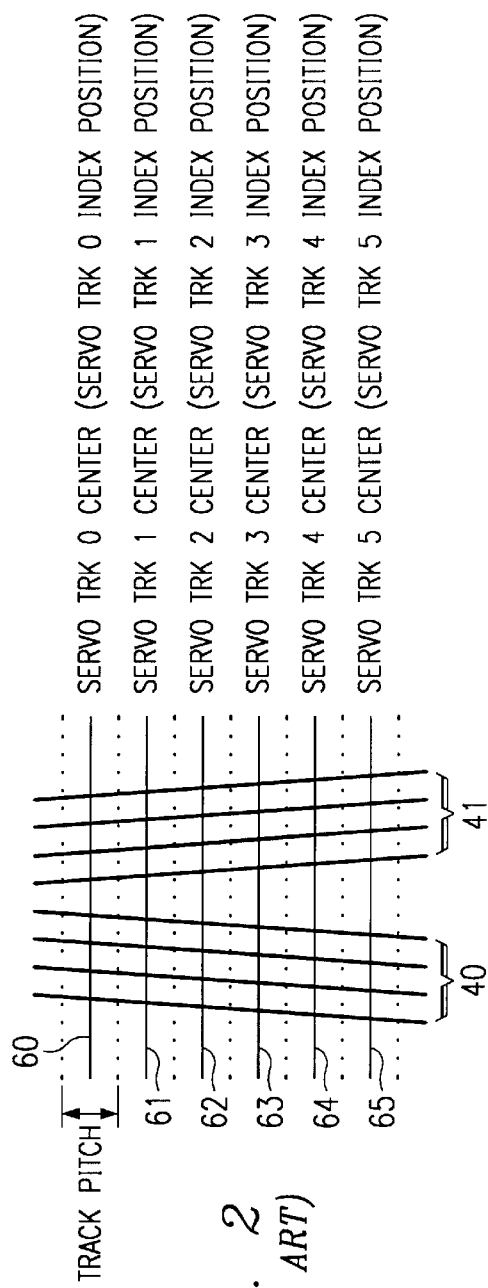
FIG. 2 is an expanded diagrammatic representation of a portion of a prior art timing based servo band of FIG. 1.

Referring to FIGS. 1 and 2, a timing based servo pattern of the type described in the incorporated '384 patent, wherein magnetic servo track patterns contain transitions recorded at differing azimuthal orientations across the width of the servo track. In the specific example of FIG. 1, five longitudinal timing based defined servo bands 30–34 are prerecorded on a magnetic tape 36 for track following at these positions. The pattern of magnetic transitions recorded in the defined servo bands is a repeated set of frames 38, each of which are of different azimuthal orientations. In the example of FIG. 1, a tape head 15 comprises at least two narrow servo read elements 45, 46, allowing two servo bands to be sensed simultaneously, so that four dually sensed bands are provided, and the outputs may be averaged or used redundantly to reduce error rates.

Referring to FIG. 1, lateral position sensing within a defined servo band is achieved by deriving a ratio of two servo pattern intervals and is insensitive to tape speed. Specifically, the lateral position may be the ratio of (1) the distance between transitions of bursts 40 and 41, called the "A" distance, to (2) the distance between transitions of bursts 40 and 42, called the "B" distance. The distances are measured by the timing between the transitions at a constant velocity. Thus, as the tape head servo read elements 45, 46 move toward the edge 47 of the tape 36, the ratio of the time between the transitions of bursts 40 and 41 to the time between the transitions of bursts 40 and 42 becomes greater, since the distance between the "A" transitions of bursts 40 and 41 is greater, while the distance between the "B" transitions of bursts 40 and 42 remains unchanged.

Referring to FIG. 2, each servo band may have a plurality of indexed defined servo positions, such as 6 separate indexed defined servo positions 60–65 for a singly sensible servo band, as illustrated by bursts 40 and 41.

Referring again to FIG. 1, the magnetic tape 36 is provided with guard bands 48, 49 at the edges of the tape, and four data track regions or locations 50–53 are provided between the defined servo bands. A plurality of read and write elements 57 are provided at the magnetic tape head 15 for reading and/or writing data on a magnetic tape. When the servo elements 45,46 are properly positioned at the defined servo bands 30–34, the read and write elements 57 are properly positioned to transfer data with respect to the data track location of the magnetic tape 36.

So as to maximize the number of data tracks, the width of the servo bands is as narrow as practical, and the separation between the servo bands is as far apart as practical, thereby allowing space for the data tracks 50–53. Thus, in moving the magnetic head between groups of data tracks, the associated dual servo sensor moves across an extended transverse span of data tracks, and the servo system lacks any servo bands for feedback for precision control.

Figure 3:
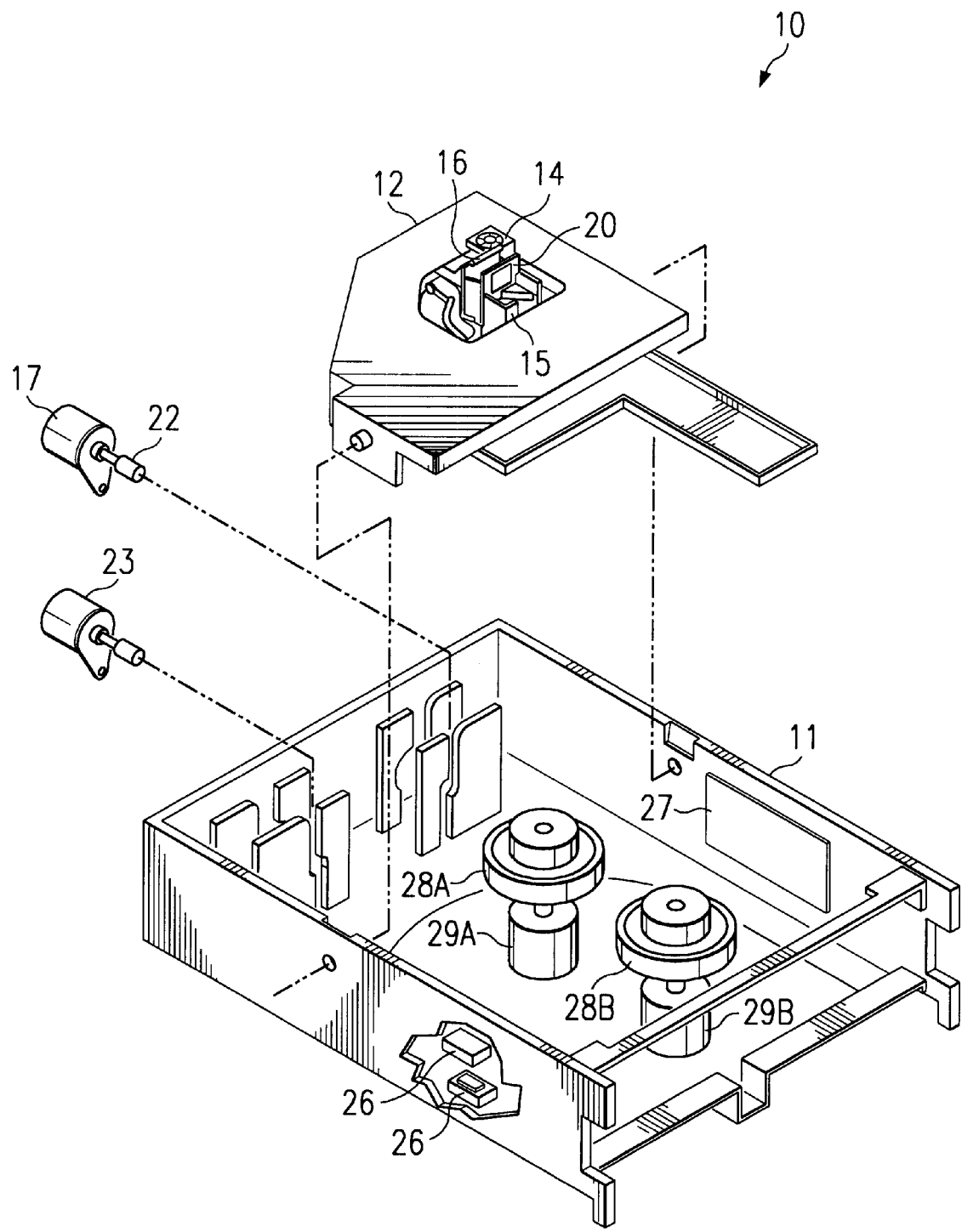
FIG. 3 is a partially exploded isometric view of a magnetic tape drive which may implement the present invention.

Referring to FIG. 3, a magnetic tape drive 10 is illustrated which may implement the present invention. A head and bearing assembly 12 is shown exploded out of the tape drive chassis 11. The magnetic tape head 15 is supported by a compound actuator 14. As discussed above, the magnetic tape head may comprise a plurality of read and write elements and a plurality of servo read elements. The compound actuator 14 positions the tape head laterally with respect to the magnetic tape to move the head between the defined servo bands and the index positions within the defined servo bands, and to follow desired bands. The compound actuator 14 comprises a coarse actuator portion 16, employing, for example, a stepper motor 17, and comprises a fine actuator portion 20, employing, for example, a voice coil actuator, mounted on the coarse actuator. As discussed above, the tape head 15 can be translated between bands over a full width of the magnetic tape primarily using the coarse actuator portion 16–17, and can track follow the lateral movement of a band, primarily using the fine actuator portion 20 of the compound actuator 14. An example of a compound actuator 14 is described in coassigned U.S. Pat. No. 5,793,573, and those of skill in the art understand that many differing types of compound actuators may be employed in implementing the present invention. In the illustrated example, the coarse actuator portion stepper motor 17 positions the magnetic tape head through a leadscrew 22, such as a worm gear.

The magnetic tape may be provided in a tape cartridge, and a tape cartridge receive/eject stepper motor 23 may provide the drive elements for receiving and ejecting the cartridges. The tape drive 10 may additionally comprise reels 28A, 28B driven by motors 29A, 29B, for moving the tape longitudinally across the tape head 15. A cartridge sensor 26, such as an LED or RF receiver, may be provided to indicate whether a cartridge is present or absent.

A servo controller 27 provides the electronics modules and processor to implement the present invention.

Figure 4:
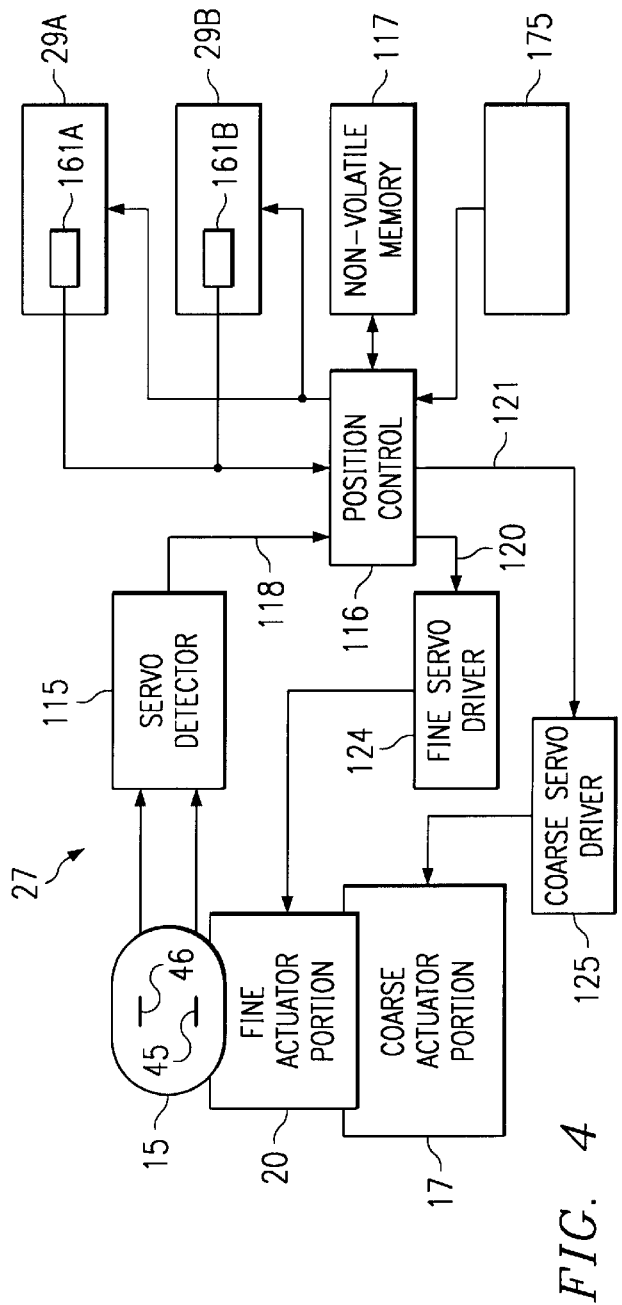
FIG. 4 is a block diagram of an embodiment of a servo system in accordance with the present invention for operating the magnetic tape drive of FIG. 3.

FIG. 4 illustrates an embodiment of a servo system having a servo controller 27 in accordance with the present invention for operating the compound actuator 14 of FIG. 1. A servo detector 115 is coupled to the servo elements 45, 46 of the tape head 15, comprising a servo sensor for sensing the lateral position of the head with respect to the defined servo bands. The servo detector 115 may comprise an electronic module of servo controller 27. A position control 116 is provided and may comprise a function within a control unit for both serving and data handling, and the full control unit may comprise a microprocessor, such as an Intel i930, with an attached non-volatile memory 117 for storing information and programming for the position control. A servo input 118 couples the position control to the servo sensor 115.

The position control 116 provides, for example, digital servo output data at servo signal outputs 120, 121 for operating the compound actuator to position the actuator portions. Those of skill in the art will understand that various devices are available to provide the needed signals for the servo detector and position control functions. A fine servo driver 124 converts track following servo output signals at output 120 to the appropriate drive signals for operating the fine actuator portion 20, and a coarse actuator driver 125 converts the coarse servo output signals at output 121 to, for example, the appropriate step drive signals for operating the step motor 17 of the coarse actuator portion 16, 17 of FIG. 1. The position control also tracks the current step count of the coarse actuator portion, which may be initialized at startup by beginning operation at a reference position. The position control function 116, memory 117, servo input 118, outputs 120, 121, and drivers 124 and 125 may also comprise electronic modules of the servo controller 27.

As discussed above, the fine actuator portion of the compound actuator typically follows the track guiding disturbances to position the magnetic head at the center of the desired data tracks. However, it has a very limited range of travel. The coarse actuator portion carries the fine actuator portion from index position to index position and between defined servo bands.

As the result, as the compound actuator moves the magnetic head 15 between groups of data tracks, the associated dual servo sensor 45, 46 moves cross an extended transverse span of data tracks, during which time the servo system lacks any servo bands for feedback for precision control. Thus, the number of step drive pulses employed to drive the stepper motor 17 forward or backward are counted up or down as the coarse actuator is moved in order to estimate when the coarse actuator has moved a certain distance such that one or more groups of the data tracks have been crossed and the desired set of two servo bands has been reached, with the desire to place the dual servo sensor 45, 46 within the target defined servo band. Then, the servo system position error signal (PES) is employed to further move the coarse actuator to the desired index position within the servo band. The fine actuator may then lock to,the desired band to follow the band. If the coarse actuator can move to the new absolute lateral position within some tolerance enough to detect the PES, no problem occurs in the sequence to acquire the target band.

However, the coarse actuator is driven by the stepper motor 17 by means of a lead screw 22, such as is shown in FIG. 3, and typically has no absolute position sensor to provide coarse actuator position feedback. Thus, the stepper motor 17 is driven essentially in an open loop manner, by supplying step signals, and actual motor response to the step signals is not monitored. The coarse actuator 16, 17 may stick at some position on the way to the new absolute reference position due to mechanical reasons, such as gear friction or particle effects, or the coarse actuator may jump over the new absolute reference position due to non-linearity factors on the coarse actuator, such as spring force effects, distortion of the gear, and gear and lead-screw backlash.

When these errors are large enough to move the servo read element out of the servo bands, the lateral position is completely lost to the track following servo system and the acquire fails.

Referring to FIG. 1, the defined servo bands 30–34 are arranged in a longitudinally shifted pattern for identification. The present invention employs the relative longitudinal shifts of the defined servo bands, such as is depicted in a table 130 of FIG. 5. Additionally referring to FIG. 1, column 131 identifies a defined servo band that is being sensed by servo sensor 46 (n), and column 132 identifies a defined servo band that is being sensed simultaneously by servo sensor 45 (n+1), of the dual servo sensor. Column 133 indicates the relative longitudinal shift position of the defined servo band sensed by servo sensor 45 with respect to that sensed by servo sensor 46, and the signs (early or late) represent the situation when the magnetic tape 36 is being moved from right to left across the tape head 15. The signs of the relative longitudinal shift positions are reversed when the magnetic tape 36 is being moved in the opposite direction.

Figures 5, 6:
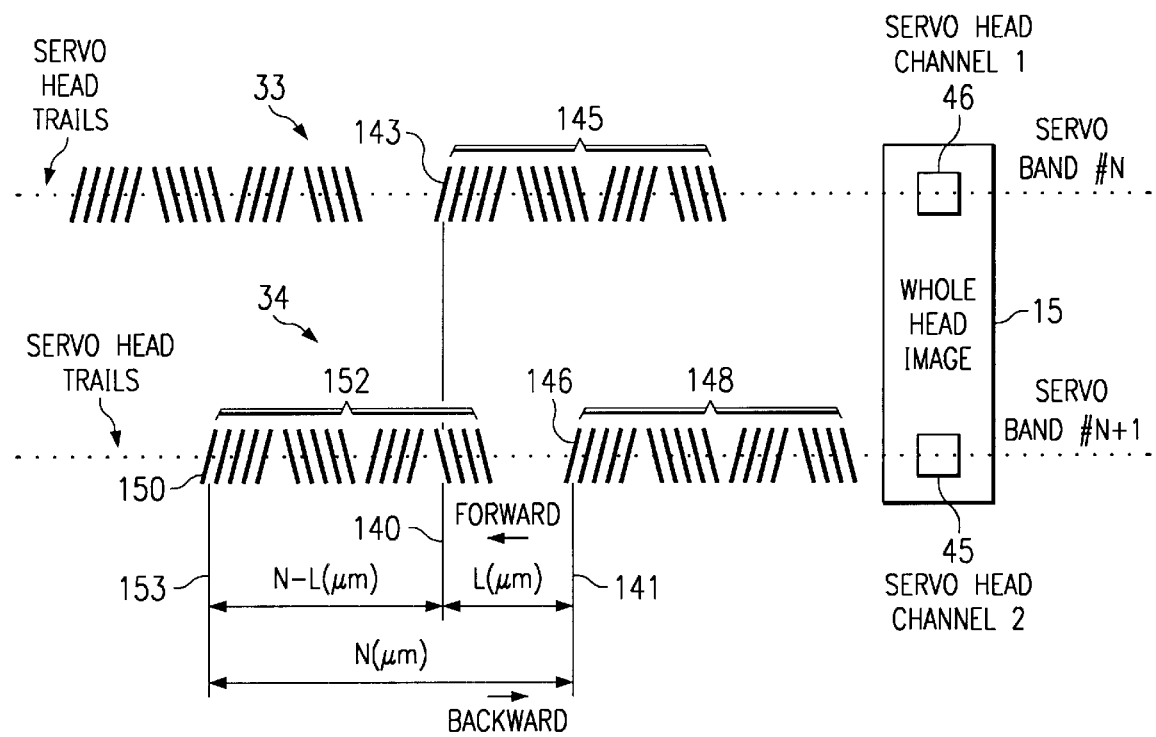
FIG. 5 is a table of relative longitudinal shifts of the defined servo bands of FIG. 1.
FIG. 6 is a diagrammatic representation of two defined servo bands of FIG. 1, illustrating the measurement of the longitudinal shifts of FIG. 5.

FIG. 6 illustrates algorithms which may be employed by the servo system 27 of FIG. 4 to implement the table of FIG. 5. Thus, as one example, the relative shift, for example, of servo bands 33 and 34, across the tape head 15 of a distance "L" may be measured by measuring the distance of the movement of the tape from position 140 to position 141, and comparing the distance of the movement, which is converted from the timing of the movement and tape velocity, to the distance of the movement represented by the table 130 of FIG. 5. The distance thus represents a measurement from the first magnetic transition 143 of burst frame 145 of defined servo band 33 to the first magnetic transition 146 of burst frame 148 of defined servo band 34. In the reverse direction, the measurement may comprise altering the order of band measurement so that the (now) last magnetic transition 146 of burst frame 148 of defined servo band 34 is detected first, and the (now) last magnetic transition 143 of burst frame 145 of defined servo band 33 is then detected. As an alternative, the distance interval between the transitions of the defined servo bands may always be measured in the same sequence of band measurement by the dual servo sensor 45, 46 of "n" to "n+1" by counting the timing intervals for different burst frames. Thus, in the forward direction (with the tape moving from right to left), the distance interval representing the "L" from position 140 to position 141 is employed as before. However, in the reverse direction, the interval representing the "200-L" is employed. Thus, in the reverse direction, the magnetic transition 143 of burst frame 145 of defined servo band 33 is detected first, and then magnetic transition 150 of burst frame 152 is then detected at position 153.

Thus, once the dual servo sensor 45, 46 is positioned at defined servo bands, the specific defined servo bands at which the dual servo sensor 45, 46 is located, is identified by means of the longitudinal shifts between the defined servo bands illustrated in table 130.

Figure 7:
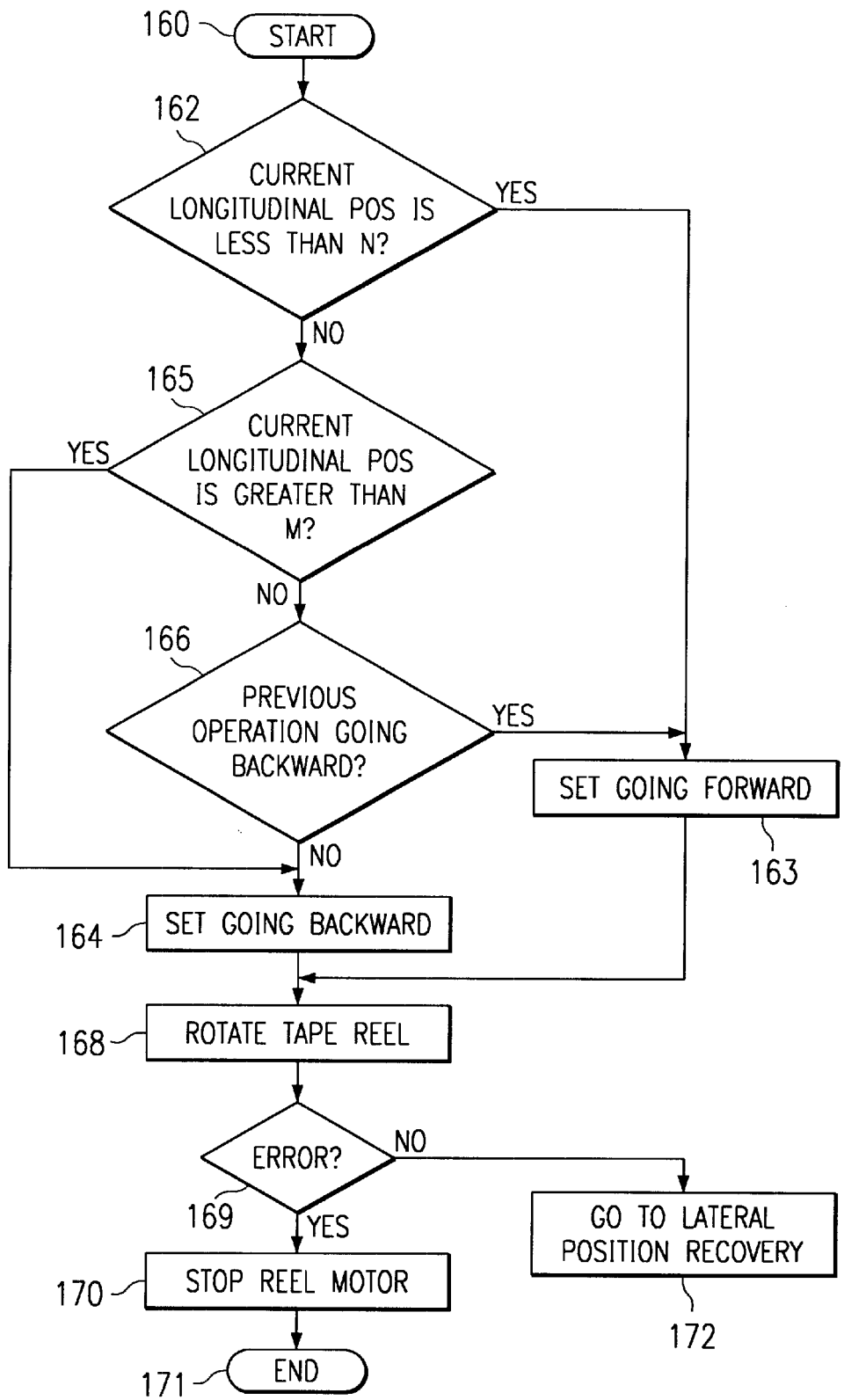
FIGS. 7–9 are flow charts depicting an embodiment of the method of the present invention as conducted by the servo system of FIG. 4.
Figure 8:
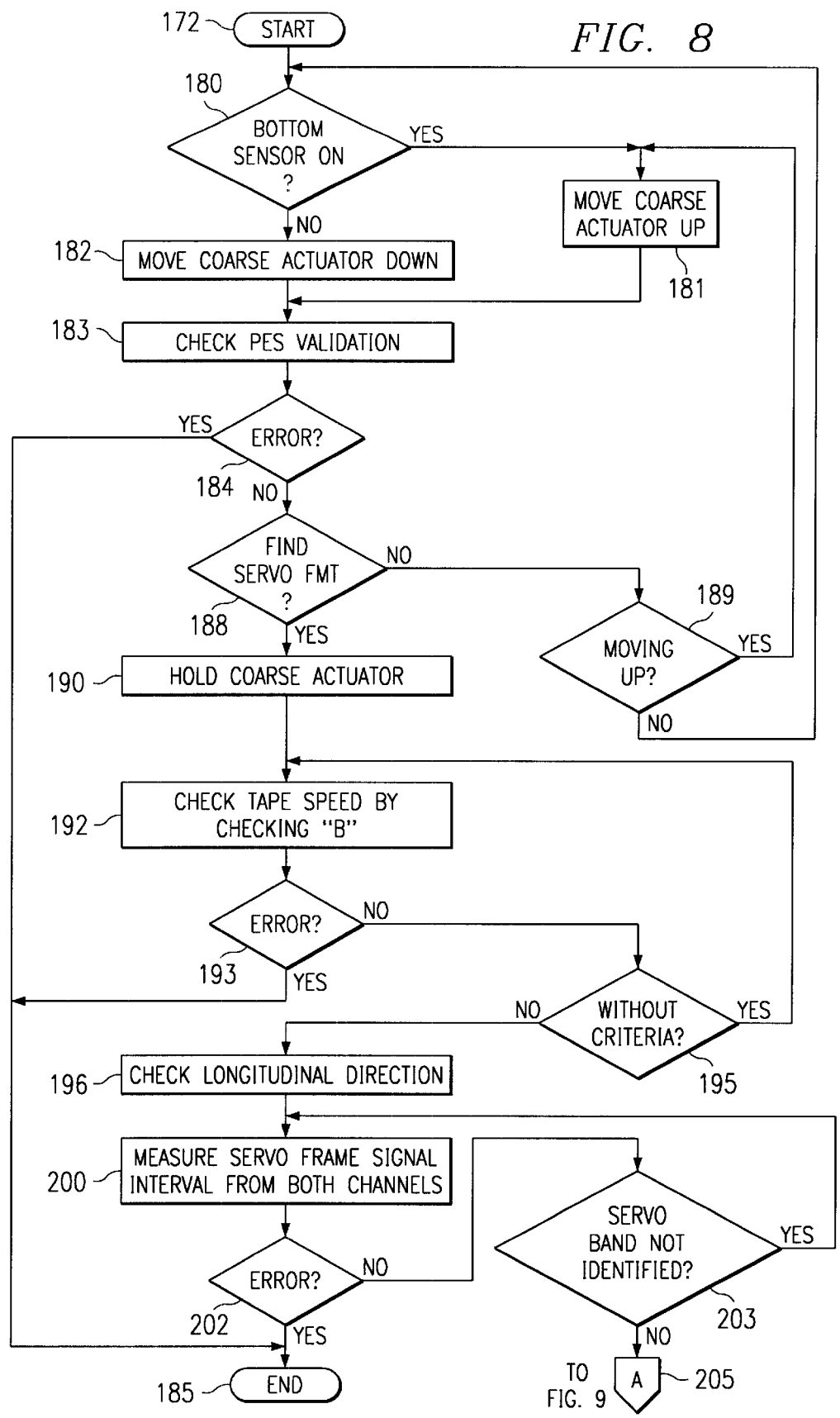
Figure 9:
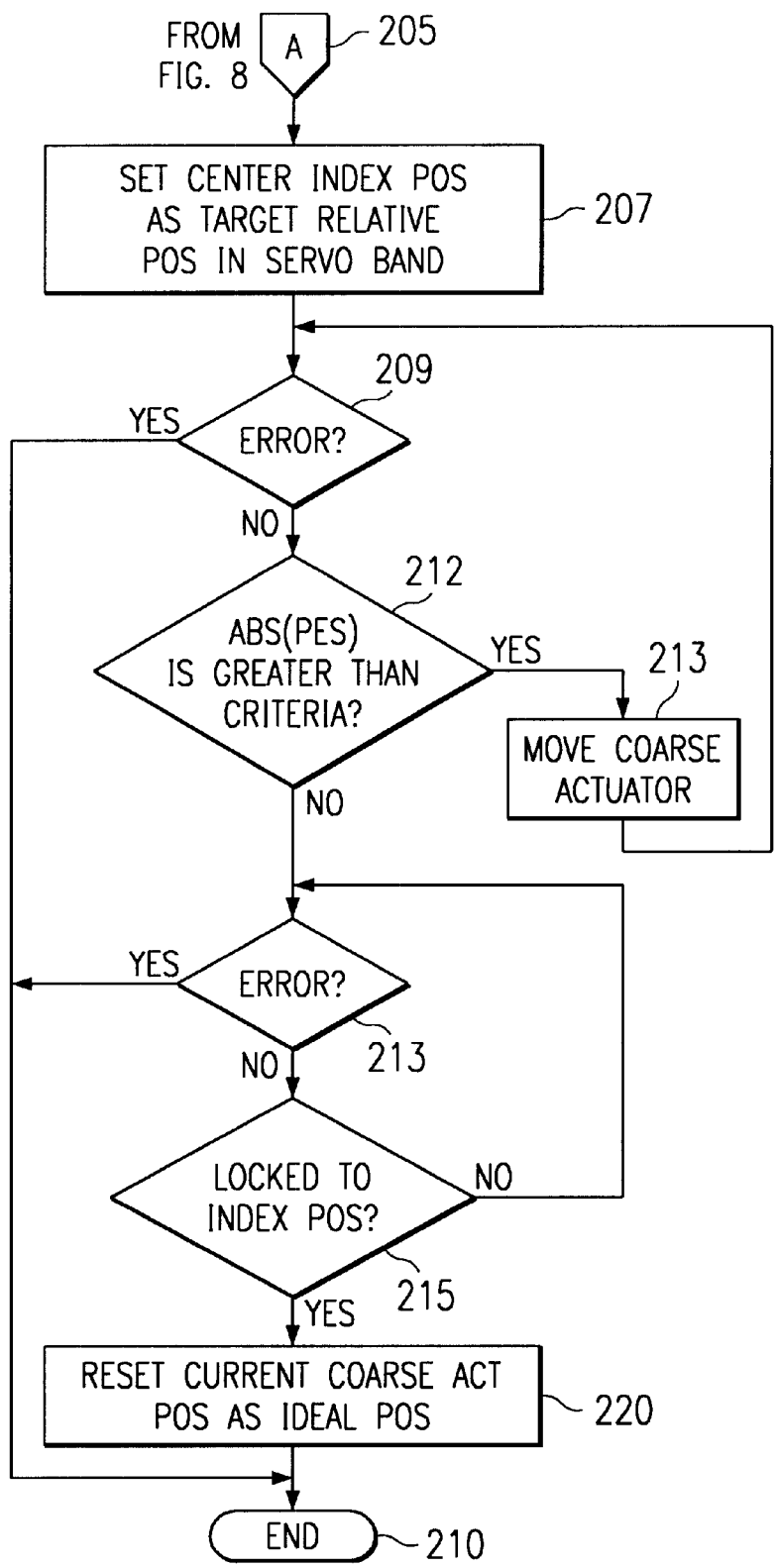

FIGS. 7–9 depict an embodiment of the method of the present invention as conducted by the servo system 27 of FIG. 4 to provide recovery of lateral position once lateral position has been lost, without the addition of ah absolute position monitor beginning at step 160 of FIG. 7.

Referring to FIG. 7 and additionally to FIGS. 3 and 4, the reel motors 29A, 29B may comprise brushless motors having Hall sensors 161A, 161B which may detect the rotation of the motor, for example, at 24 positions per full revolution. Either motor 29A, 29B may thus provide signals that appear as a tachometer. This information may be employed by the servo system to control the speed of the tape to within a desired criteria. Alternatively, sensor 161 may comprise a tachometer affixed to a drive shaft of a motor 29A or 29B. Typically, the magnetic tape must be wound from a specific starting position, for example, at the beginning of tape as a tape is unwound from a single reel cartridge. The position control 116 may therefore count the signals from one of the sensors 161A, 161B adding counts as the tape is unwound, and subtracting counts as the tape is wound back onto the reel of the cartridge. Thus, the approximate longitudinal position of the tape is known by the present count, as compared to a count representing the total length of the tape.

In step 162, in accordance with the present invention, the position control 116 determines whether the longitudinal position is within a predetermined distance of an end of the tape, for example, the count at the time the lateral position was lost is less than a predetermined count "N" indicating that the tape is within the predetermined distance of 'the beginning end of the tape, or BOT. In one example, the predetermined distance represented by count "N" may be set to the middle of the tape Thus, if the count is less than "N", "YES" in step 162, the tape is closer to the BOT, and, in step 163, the position control 116 operates the drive motor 28 to move the tape in the forward direction away from BOT and toward the far end, or end of tape (EOT). If the count is greater than "N", "NO" in step 162, the tape is closer to the EOT, and, in step 164, the position control 116 operates the drive motor 28 to move the tape in the backward direction away from EOT and toward the BOT. As the result, even though the lateral position has been lost, and the tape must be moved to get servo signals, the tape will not be allowed to unwind off one of reels, but rather the tape is moved away from the close end.

As an alternative, the predetermined distance of count "N" of step 162 may be set to a shorter distance, closer to BOT, and steps 165 and 166 may be implemented. In this embodiment, the predetermined distance of count "N" of step 162 may be set to a small percentage of the total length of the tape, for example, for a tape of 600 meters in length having 5 meters at each end for safety purposes and 5 meters for information, the count "N" may be set to a combined distance of 40 meters, indicating that if the head 15 is within the predetermined distance, "YES", the tape is moved away from BOT in step 163. Similarly, in step 165, the distance from the far end of the tape (EOT) is determined, and a predetermined distance of count "M" of step 165 may be set to a distance from the EOT that is the same or a similar small percentage of the total length of the tape as was step 162, for example, a combined distance of 40 meters. The count "M", however, is based on the total count from the BOT. Thus, if the head was outside the predetermined distance of step 162, the process proceeds to step 165, and if step 165 indicates that the head 15 is within the predetermined distance represented by the count being greater than the count "M", "YES", the position control 116 operates the drive motor 28 to move the tape in the backward direction away from EOT and toward the BOT in step 164. Further, if the head was outside the predetermined distance of step 162, the process proceeded to step 165, and if the head was also outside the predetermined distance of step 165, the process proceeds to step 166. In step 166, the position control determines the direction that the tape was moving when the lateral position was lost, for example, by determining whether the tape was going backward, and operating the drive 28 to move in the opposite direction in either step 163 or 164, rotating the tape reel in step 168. Thus, if the tape was outside both predetermined distances of the BOT and EOT, and is somewhere in the center section of the tape, the servo system has a length of more than 30 meters to find the servo bands and recover track following.

By reversing the direction of the tape, it is moved in the direction opposite to the original direction while the recovery occurs, with the result that the tape will be moved back across the point where the lateral position was lost. Thus, upon recovery of lateral position, the tape motion may again be reversed, so that the tape is moving in the original direction and is ready for the next operation.

In step 169, the servo system checks for a major error, such as failure to receive signals from the sensor 161, and, if there is an error, stops the reel motor in step 170 and ends the process in step 171. If, however, there is no error, the process proceeds to the lateral position recovery at step 172.

Referring to FIG. 8, and additionally to FIGS. 1 and 4, a home lateral position sensor 175 is provided for sensing whether the compound actuator is within a predetermined distance of an edge of the tape. As an example, the home lateral position sensor may be located toward the bottom of the tape path, and sense whether the tape head 15 of FIG. 1 has moved downward such that servo sensor 45 is close to the edge 47 of the tape 36. The home lateral position sensor 175 may turn on and provide a signal if the head 15 is in a.position such that the servo sensor 45 is beyond the defined servo band 33 and toward the edge 47. Other arrangements are possible, including having the home lateral position sensor 175 indicate that the head has moved to the bottom half of the magnetic tape 36.

In step 180, in accordance with the present invention, the position control 116 of FIG. 4 determines whether the bottom lateral position sensor 175 is on. If so, the position control 116, in step 181, operates the coarse actuator portion 17 to move the tape head 15 up and away from the edge 47 of the tape 36 of FIG. 1. If the sensor 175 is off, the position control 116, in step 182, operates the coarse actuator portion 17 to move the tape head 15 down and towards the edge 47 of the tape 36 of FIG. 1. In step 183, the servo system checks for any error, such as tape stoppage. If there is an error, step 184 ends the process at step 185.

In step 188, the position control 116 responds to the servo detector 115 to determine whether servo transitions of the defined servo bands 30–34 are being detected, indicating that the dual servo sensor 45, 46 is over two defined servo bands. Typically, the servo transitions are recorded at a significantly lower density than the data, and therefore the servo signals representing the servo transitions are received at a much lower frequency and a much greater amplitude than data. Thus, the data may be undetectable by the servo detector 115, such that step 188 may comprise determining whether any signals are being detected, with the assumption that any detected signals represent the servo transitions.

If no servo signals are detected, "NO" in step 188, indicating that the dual servo sensor 45, 46 remains over data areas, step 189 determines whether the coarse actuator is moving the head 15 up and away from the edge 47 of the magnetic tape 36. If so, step 181 continues to move the coarse actuator in that direction. If the coarse actuator is moving the head 15 toward the edge 47 of the magnetic tape 36, "NO" in step 189, step 180 determines whether the bottom sensor 175 has turned on, and moves the coarse actuator accordingly, as discussed above.

If step 188 determines that the servo transitions of the defined servo bands 30–34 are being detected, "YES", the dual servo sensor 45, 46 is now located at a set of defined servo bands. Hence, in step 190, the position control 116 stops and holds the coarse actuator.

Now at defined servo bands, the process then identifies which defined servo bands are being detected so as to recover the lateral position, by measuring the timing intervals represented by the longitudinal shifts of the defined servo bands, such as is depicted in table 130 of FIG. 5, as discussed above. One way of detecting the timing intervals is to measure the timing intervals as clock counter values by position control 116.

To utilize these clock counter values as valid information, the tape speed should be controlled with a certain criteria. The tape speed is checked in accordance with the present invention employing the characteristics of the defined servo bands 30–34 themselves. As discussed above, and with reference to FIG. 1, the "B" values represent the time between transitions of bursts 40 and 42, called the "B" distance. Regardless of the lateral position of the tape head servo read elements 45, 46 in a defined servo band, the distance, and therefore the timing interval, between the "B" transitions of bursts 40 and 42 remains unchanged. Therefore, step 192 comprises checking the tape speed by checking the "B" timing intervals. Step 193 represents a major error preventing the checking of the timing intervals, such as failure of the drive motor to operate, the occurrence of which ends the process at step 185. As the "B" timing intervals are already employed for determining the PES for the lateral positioning of the head 15, no additional circuitry is required to check the tape speed. In step 195, the determination is made whether the magnetic tape is being driven within the certain criteria of the nominal speed. As an example, the tape should be at a speed within 10% of nominal.

If the tape is not yet within the criteria, "YES" in step 195, the process cycles back to step 192 to again check the "B" timing intervals.

Once the tape has reached the desired speed, the longitudinal direction of the tape is checked in step 196 to determine, for example, with reference to FIG. 6 and the above discussion, the order of the defined servo bands are to be sensed to measure the "L" intervals, or, alternatively, with the tape in the forward direction (with the tape moving from right to left), the interval representing the "L" from position 140 to position 141 is to be employed, and, in the reverse direction, the interval representing the "N−L" is to be employed.

Then, in step 200, in accordance with the present invention, the selected algorithm is employed by the servo system 27 of FIG. 4 to measure the relative shift between the defined servo bands detected by the dual servo transducers 45, 46, implementing the table of FIG. 5. Thus, as one example, the relative shift, for example, of servo bands 33 and 34, across the tape head 15 a distance "L" may be measured by measuring the timing of the movement of the tape from position 140 to position 141, and comparing the distance of the movement to the distance of the movement represented by the table 130 of FIG. 5. In the reverse direction, the measurement may comprise altering the order of band measurement so that the (now) last magnetic transition 146 of burst frame 148 of defined servo band 34 is detected first, and the (now) last magnetic transition 143 of burst frame 145 of defined servo band 33 is then detected. Alternatively, as discussed above, the interval between the transitions of the defined servo bands may always be measured in the same sequence of band measurement by the dual servo sensor 45, 46 of "n" to "n+1" by counting the timing interval representing the "L" from position 141 to position 140, in the forward direction and, in the reverse direction, the interval representing the "N−L". The position control may thereby identify the defined servo bands 30–34 at which the dual servo sensor 45, 46 is currently positioned in accordance with the table 130 of FIG. 5.

Step 202 represents a major error, such as failure to detect any signals by the dual servo sensor 45, 46, and terminates the process at step 185 if there is an error. Step 203 determines whether the servo band remains unidentified, and, if so, repeats step 200.

Thus, by detecting the longitudinal shift to identify which ones of the two defined servo bands, the lateral position has been recovered. Upon identifying the present position of the dual servo sensor 45, 46 as the identified defined servo bands 30–34, "NO" in step 203, the lateral position of the head 15 has been recovered to within the context of the set of defined servo bands.

To obtain a more precise lateral position, as represented by the index positions, step 205 advances the process to FIG. 9. In step 207, servo controller 27 sets the target index position for the servo to an index position substantially the centers of the two defined servo bands. Referring additionally to FIG. 2, the center is represented by either index position 62 or index position 63. Step 209 determines whether there is a major error, and, if so, ends the process at step 210. Step 212 determines whether the dual servo sensor 45, 46 is at the set index position at the centers of the two defined servo bands, or is within a specified criteria (the normal track following criteria) of the index position. If not, the position control 116 of the servo controller 27 moves the coarse actuator portion 17 to position the dual servo sensors at substantially the target index position at the centers of said two defined servo bands, and again conducts steps 209 and 212.

If the PES is within the specified criteria, "NO" in step 212, the servo system 27 may begin to, track follow the target index position. The process proceeds to step 213 to determine if there is a major error at that time. If so, the process is terminated at step 210.

Step 215 determines whether the servo system 27 is track following and locked to the target index position. If not, the process cycles while the servo system locks to the target index position. When the servo system is locked to the target index position of the defined servo bands, step 220 resets the identification of the current position for the coarse actuator by the position control 116 to the actual current location of the coarse actuator, which is the locked target index position selected in step 207 of the defined servo bands identified in step 200 of FIG. 8, thereby locating the precise position of the tape head 15.

Thus, the precise lateral position of the tape head has been recovered, after having been lost, without the addition of an absolute position monitor, saving the mounting space and the cost of an absolute position monitor. The recovery of the position has also been accomplished without having to reset the tape, and/or the coarse actuator to "home positions", thereby completing the recovery in the vicinity of the transaction that was occurring when the lateral position was lost. As the result, the recovery may be conducted in significantly less time and with less disruptive activity than if movement to "home positions" were required, and at less cost than if an absolute position monitor was employed.

As discussed above, if the tape was in a longitudinal position away from the ends of the tape, the direction of motion was reversed in step 163 or step 164 of FIG. 7 to bring the tape back across the original position when the lateral position was lost. Then, step 220 of FIG. 9 may additionally reverse direction again, so that the tape is now moving in the original direction and is ready for the next operation after recovery of the lateral position.

Those of skill in the art will understand that the above steps may be altered in sequence and changed to equivalent steps.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a servo system of a magnetic tape drive, said servo system for positioning a magnetic head laterally with respect to a plurality of parallel, longitudinal defined servo bands of a magnetic tape, said defined servo bands each separated by a plurality of data tracks parallel to said defined servo bands, said defined servo bands arranged in a longitudinally shifted pattern for identification, said magnetic tape drive having a drive system for moving said magnetic tape in said longitudinal direction at a nominal speed for reading and/or writing data on said magnetic tape, said servo system comprising a dual servo sensor for sensing lateral position of said head with respect to two of said defined servo bands, a compound actuator having a fine actuator portion for translating, said head laterally with respect to said defined servo bands and a coarse actuator portion for translating said fine actuator portion laterally with respect to said defined servo bands, a home lateral position sensor for sensing whether said compound actuator is within a predetermined distance of an edge of said tape, a longitudinal position estimator for estimating the longitudinal position of said tape, and a servo controller for operating said compound actuator to laterally position said dual servo sensor at two of said defined servo bands, and to track follow said two defined servo bands, hereby positioning said head, a method for recovering lateral position, comprising:

responding to a loss of said lateral position, sensing said longitudinal position estimator estimated longitudinal position of said magnetic tape;

if said sensed estimated longitudinal position of said magnetic tape is within a predetermined distance of an end of said tape, operating said magnetic tape drive to continuously move said magnetic tape in a longitudinal direction away from said sensed end of said magnetic tape;

sensing said home lateral position sensor to determine whether said compound actuator is within said predetermined distance of said edge of said magnetic tape;

if said compound actuator is within said predetermined distance of said edge of said magnetic tape, operating said servo controller to move said coarse actuator portion in a lateral direction away from said edge of said magnetic tape; else, operating said servo controller to move said coarse actuator portion in a lateral direction toward said edge;

sensing said dual servo sensor to detect any two of said defined servo bands; and upon sensing said any two of said defined servo bands, detecting said longitudinal shift to identify which ones of said two defined servo bands have been detected.

2. The method of claim 1, wherein said step of operating said magnetic tape drive to continuously move said magnetic tape in said longitudinal direction additionally comprises moving said magnetic tape at a speed within a predetermined criteria of said nominal speed.

3. The method of claim 2, wherein said defined servo bands comprise timing based repeating servo patterns of magnetic transition, having a fixed distance interval between a first set of transitions and laterally variable distance interval between a second set of transitions of said repeating pattern, and wherein said step of operating said magnetic tape drive to continuously move said magnetic tape in said longitudinal direction at said speed, additionally comprises sensing said time of movement of said fixed interval transitions in said repeating patterns to measure said magnetic tape speed for comparison to said nominal speed.

4. The method of claim 3, wherein said step of, upon sensing said any two of said defined servo bands, detecting said longitudinal shift, additionally comprises sensing a ratio of distance of movement of said laterally variable transitions to said distance of movement of said fixed interval transitions of each of said two defined servo bands to determine the lateral position of said servo sensor with respect to said defined servo bands, and operating said servo controller to move coarse actuator portion to position said dual servo sensors at substantially the centers of said two defined servo bands.

5. The method of claim 1, wherein said step of continuously move said magnetic tape in a longitudinal direction additionally comprises, if said sensed estimated longitudinal position of said magnetic tape is outside said predetermined distance of either end of said tape, determining the direction said drive was moving said magnetic tape and operating said drive to move said tape in the opposite direction.

6. A servo system of a magnetic tape drive, said servo system for positioning a magnetic head laterally with respect to a plurality of parallel, longitudinal defined servo bands of a magnetic tape, said defined servo bands each separated by a plurality of data tracks parallel to said defined servo bands, said defined servo bands arranged in a longitudinally shifted pattern for identification, said magnetic tape drive having a drive system for moving said magnetic tape in said longitudinal direction at a nominal speed for reading and/or writing data on said magnetic tape, and said servo system for recovering lateral position, comprising:

a dual servo sensor for.sensing lateral position of said head with respect to two of said defined servo bands;

a compound actuator having a fine actuator portion for translating said head laterally with respect to said defined servo bands and a coarse actuator portion for translating said fine actuator portion laterally with respect to said defined servo bands;

a home lateral position sensor for sensing whether said compound actuator is within a predetermined distance of an edge of said tape;

a longitudinal position estimator for estimating the longitudinal position of said tape; and a servo controller coupled to said dual sensor, said compound actuator, said home lateral position sensor, said longitudinal position estimator, and said drive system, for operating said compound actuator to laterally position said dual servo sensor at two of said defined servo bands, and to track follow said two defined servo bands, thereby positioning said head, said servo controller:

responding to a loss of said lateral position, sensing said longitudinal position estimator estimated longitudinal position of said magnetic tape;

if said sensed estimated longitudinal position of said magnetic tape is within a predetermined distance of an end of said tape, operating said magnetic tape drive to continuously move said magnetic tape in a longitudinal direction away from said sensed end of said magnetic tape;

sensing said home lateral position sensor to determine whether said compound actuator is within said predetermined distance of said edge of said magnetic tape;

if said compound actuator is within said predetermined distance of said edge of said magnetic tape, operating said coarse actuator portion to move in a lateral direction away from said edge of said magnetic tape; else, operating said coarse actuator portion to move in a lateral direction toward said edge;.

sensing said dual servo sensor to detect any two of said defined servo bands; and upon sensing said any two of said defined servo bands, detecting said longitudinal shift to identify which ones of said two defined servo bands have been detected.

7. The servo system of claim 6, wherein said servo controller operates said magnetic tape drive to continuously move said magnetic tape in said longitudinal direction, additionally moving said magnetic tape at a speed within a predetermined criteria of said nominal speed.

8. The servo system of claim 7, wherein said defined servo bands comprise timing based repeating servo patterns of magnetic transition, having a fixed distance interval between a first set of transitions and laterally variable distance interval between a second set of transitions of said repeating pattern, wherein said dual servo sensor detects said transitions, and wherein servo controller additionally senses time of movement of said fixed interval transitions in said repeating patterns detected by said dual servo sensor to measure said magnetic tape speed for comparison to said nominal speed, operating said magnetic tape drive to continuously move said magnetic tape in said longitudinal direction at said speed.

9. The servo system of claim 8, wherein said servo controller, upon sensing said any two of said defined servo bands, detecting said longitudinal shift, additionally determines a ratio of distance of movement of said laterally variable transitions sensed by said dual servo sensor to said distance of movement of said fixed interval transitions sensed by said dual servo sensor of each of said two defined servo bands to further determine the lateral position of said servo sensor with respect to said defined servo bands, and moves coarse actuator portion to position said dual servo sensor at substantially the centers of said two defined servo bands.

10. The servo system of claim 6, wherein said servo controller additionally responds to said sensed estimated longitudinal position of said magnetic tape being outside said predetermined distance of either end of said tape, determines the direction said drive was moving said magnetic tape and operates said drive to move said tape in the opposite direction.

11. A magnetic tape data storage drive for transferring data with respect to a magnetic tape, said magnetic tape having a plurality of parallel, longitudinal defined servo bands of a magnetic tape, said defined servo bands each separated by a plurality of data tracks parallel to said defined servo bands, said defined servo bands arranged in a longitudinally shifted pattern for identification, comprising:

a magnetic head for reading and/or writing data on said magnetic tape;

a drive system for moving said magnetic tape in said longitudinal direction at a nominal speed to allow said magnetic head to read and/or write data on said magnetic tape;

a dual servo sensor for sensing lateral position of said magnetic head with respect to two of said defined servo bands;

a compound actuator having a fine actuator portion for translating said magnetic head laterally with respect to said defined servo bands and a coarse actuator portion for translating said fine actuator portion laterally with respect to said defined servo bands;

a home lateral position sensor for sensing whether said compound actuator is within a predetermined distance of an edge of said tape;

a longitudinal position estimator for estimating the longitudinal position of said tape; and a servo controller coupled to said dual sensor, said compound actuator, said home lateral position sensor, said longitudinal position estimator, and said drive system, for operating said compound actuator to laterally position said dual servo sensor at two of said defined servo bands, and to track follow said two defined servo bands, thereby positioning said head, said servo controller:

responding to a loss of said lateral position, sensing said longitudinal position estimator estimated longitudinal position of said magnetic tape;

if said sensed estimated longitudinal position of said magnetic tape is within a predetermined distance of an end of said tape, operating said magnetic tape drive to continuously move said magnetic tape in a longitudinal direction away from said sensed end of said magnetic tape;

sensing said home lateral position sensor to determine whether said compound actuator is within said predetermined distance of said edge of said magnetic tape;

if said compound actuator is within said predetermined distance of said edge of said magnetic tape, operating said coarse actuator portion to move in a lateral direction away from said edge of said magnetic tape; else, operating said coarse actuator portion to move in a lateral direction toward said edge;

sensing said dual servo sensor to detect any two of said defined servo bands; and upon sensing said any two of said defined servo bands, detecting said longitudinal shift to identify which ones of said two defined servo bands have been detected.

12. The magnetic tape data storage drive of claim 11, wherein said servo controller operates said magnetic tape drive to continuously move said magnetic tape in said longitudinal direction, additionally moving said magnetic tape at a speed within a predetermined criteria of said nominal speed.

13. The magnetic tape data storage drive of claim 12, wherein said defined servo bands comprise timing based repeating servo patterns of magnetic transition, having a fixed distance interval between a first set of transitions and laterally variable distance interval between a second set of transitions of said repeating pattern, wherein said dual servo sensor detects said transitions, and wherein servo controller additionally senses time of movement of said fixed interval transitions in said, repeating patterns detected by said dual servo sensor to measure said magnetic tape speed for comparison to said nominal speed, operating said magnetic tape drive to continuously move said magnetic tape in said longitudinal direction at said speed.

14. The magnetic tape data storage drive of claim 13, wherein said servo controller, upon sensing said any two of said defined servo bands, detecting said longitudinal shift, additionally determines a ratio of distance of movement of said laterally variable transitions sensed by said dual servo sensor to said distance of movement of said fixed interval transitions sensed by said dual servo sensor of each of said two defined servo bands to further determine the lateral position of said servo sensor with respect to said defined servo bands, and moves coarse actuator portion to position said dual servo sensor at substantially the centers of said two defined servo bands.

15. The magnetic tape data storage drive of claim 11, wherein said servo controller additionally responds to said sensed estimated longitudinal position of said magnetic tape being outside said predetermined distance of either end of said tape, determines the direction said drive was moving said magnetic tape and operates said drive to move said tape in the opposite direction.

\* \* \* \* \*